United States Patent [19]

Horrocks

[11] Patent Number: 4,694,176

[45] Date of Patent: Sep. 15, 1987

[54] METHOD AND APPARATUS FOR INDICATING QUENCH OF A LIQUID SCINTILLATION SOLUTION

[75] Inventor: Donald L. Horrocks, Placentia, Calif.

[73] Assignee: Beckman Instruments, Inc., Fullerton, Calif.

[21] Appl. No.: 818,059

[22] Filed: Jan. 10, 1986

Related U.S. Application Data

[63] Continuation of Ser. No. 612,180, May 21, 1984, abandoned.

[51] Int. Cl.⁴ ............................................. G01T 1/204
[52] U.S. Cl. .................................... 250/362; 250/328; 250/365
[58] Field of Search ...................... 250/328, 364, 252.1, 250/461.1, 461.2, 362, 365

[56] References Cited

U.S. PATENT DOCUMENTS

| | | | |
|---|---|---|---|
| 3,179,801 | 4/1965 | Scherbatskoy | 250/252.1 |
| 3,390,269 | 6/1968 | Packard . | |
| 3,437,812 | 4/1969 | Packard . | |
| 3,500,447 | 3/1970 | Frank . | |
| 3,560,744 | 2/1971 | Jordan . | |
| 3,688,120 | 8/1972 | Packard . | |
| 3,899,673 | 8/1975 | Packard | 250/328 |
| 4,002,909 | 1/1977 | Packard et al. | 250/328 |
| 4,029,401 | 6/1977 | Nather | 250/328 |
| 4,187,426 | 2/1980 | Jordan | 250/364 |
| 4,418,281 | 11/1983 | Horrocks | 250/328 |

FOREIGN PATENT DOCUMENTS 1422526 1/1976 United Kingdom .

OTHER PUBLICATIONS

B. S. Meyer and J. P. F. Sellschop, "Cosmic-Ray Muon Intensity Deep Underground versus Depth", Physical Review D, vol. 1, No. 8, Apr. 15, 1970, p. 2229.

Isadore B. Berlman, "Efficiency of Energy Transfer in a Solution of PPO in Xylene", The Journal of Chemical Physics, vol. 33, No. 4, Oct. 1960, p. 1124.

Primary Examiner—Carolyn E. Fields
Attorney, Agent, or Firm—W. H. May; P. R. Harder; S. R. Markl

[57] ABSTRACT

A method and apparatus for indicating quench associated with a liquid scintillation solution wherein the solution includes a sample, a solvent and a solute. The method includes exposing the solution to flashes of light, detecting a pulse height spectrum for scintillations produced in the solution in response to the light flashes, determining a unique point on such pulse height spectrum, and relating the unique point to a corresponding pulse height value, such pulse height value providing an indication of quench associated with the solution. The wavelength of light preferably excites essentially only the solvent and the light flash intensity and duration is such that the pulse height spectrum produced in response to the light flashes does not overlap a pulse height spectrum for the sample in the solution. An attribute of the shape of the light pulse height spectrum may be examined to provide an indication of the homogeneous or non-homogeneous nature of the quench present in the solution.

13 Claims, 2 Drawing Figures

METHOD AND APPARATUS FOR INDICATING QUENCH OF A LIQUID SCINTILLATION SOLUTION

This is a continuation, of application Ser. No. 612,180 filed May 21, 1984, now abandoned.

BACKGROUND OF THE INVENTION

The present invention relates generally to the field of liquid scintillation counting and in particular to an improved method and apparatus for indicating quench of a liquid scintillation solution.

Liquid scintillation counting techniques are well known for measuring the activity of samples containing radionuclides. Such a radioactive sample, typically a beta emitter, is dissolved or suspended in a liquid scintillation medium. The liquid scintillation medium in turn comprises a solvent or solvents, typically methyl-benzene derivatives, and a solute or solutes present in a few percent by weight of the liquid scintillation medium. It is theorized that most of the kinetic energy from the nuclear disintegrations of the radioactive sample is absorbed by the solvent and then transferred to the solute which emits photons as visible light flashes or scintillations. The amount of light emitted from a scintillation is proportional to the energy of the corresponding nuclear disintegration.

A liquid scintillation counter measures the relative intensities of scintillations occurring within a liquid scintillation solution. As used herein, a liquid scintillation solution means a solution comprising the sample dissolved or suspended within the liquid scintillation medium. Typically, scintillations occurring within the liquid scintillation solution are detected by a suitable photodetector which produces output pulses having pulse heights proportional to the number of photons by the corresponding scintillations. The liquid scintillation counter counts the pulses in a plurality of pulse height channels or "windows" having upper and lower pulse height limits that together span a predetermined range of pulse heights. The counts accumulated in the windows may be plotted with respect to corresponding pulse heights to provide a pulse height spectrum representing the energy spectrum of the nuclear radiation emitted by the radioactive sample.

It is well known in the liquid scintillation counting art that materials present in the liquid scintillation solution can decrease the number of photons reaching the photodetector for a given nuclear disintegration. For example, the production of photons in the solution may be decreased or emitted photons can be absorbed. Such effects are commonly referred to as "quenching" and in each case result in the reduction in the number of photons detectable by the photodetector. Because quenching decreases the number of photons applied to the photodetector, some scintillation events which would be detected in an unquenched sample are below the photodetector detection threshold in a quenched sample. The result is that the number of counts per unit time detected by the photodetector for a quenched sample is decreased as compared with an otherwise identical unquenched sample. The scintillation count rate detected in a quenched sample as compared with the disintegration rate occurring within the sample is commonly referred to as "counting efficiency".

Quenching acts equally on all events produced by the same type of excitation particle, for example, electron (beta), alpha, proton, and so on. Thus, if quenching is sufficient to reduce the measured response for one disintegration by a given percentage, it will reduce all responses by the same percentage. In a liquid scintillation counter, quenching results in a shift of the pulse height spectrum detected by the counter to lower pulse height values, which is commonly referred to as "pulse height shift".

Continuing efforts in the liquid scintillation art have been directed to measuring quench. Many prior quench determination methods employ an external radiation source, such as a gamma source, which may be positioned so as to irradiate the liquid scintillation solution. A pulse height spectrum of the solution in response to the external source is used to provide an indication of quench. Several quench determination methods using an external source are discussed, for example, in U.S. Pat. No. 4,075,480.

When using an external source to determine quench, the solution pulse height spectrum in response to the external source radiation obscures or interferes with the pulse height spectrum produced by the sample in the solution. Consequently, it is not possible to simultaneously count sample activity and perform a quench determination. Typically, sample activity is counted during one time period and quench determination is performed during a different time period. In a static liquid scintillation counting system, that is, one where a static or stationary sample is counted, the use of an external standard to determine quench lengthens the amount of time required to measure sample activity corrected for quench.

External standard quench determination methods are even less desirable in flow liquid scintillation systems. In such systems, a sample in a liquid scintillation medium is flowed through a flow detector. Thus, the quench of the solution may change from the time that sample activity is measured to the time that a quench determination is performed, resulting in an inaccurate determination of quench. Moreover, sample activity data is lost during the time that quench determination is being performed, a distinct disadvantage where the liquid scintillation solution, including the sample, is continuously flowing through the flow detector.

SUMMARY OF THE INVENTION

A method and apparatus in accordance with the present invention overcomes the difficulties and limitations described above. Such a method and apparatus uniquely and inventively enables the determination of quench at the same time that sample count data is being gathered. Thus, sample activity and quench may be simultaneously determined, an advantage in both static and flowing liquid scintillation counting systems. Moreover, the method and apparatus of the present invention does not require the use of an external radioactive source, thereby eliminating structure in liquid scintillation counting systems for safely handling such a source.

Toward the foregoing ends, the present invention is directed to generating light flashes wherein the light includes a predetermined wavelength selected to excite essentially only the solvent within a liquid scintillation solution, exposing the liquid scintillation solution to such light flashes, detecting a pulse height spectrum for scintillations produced in the solution in response to the light flashes, determining a unique point on the pulse height spectrum, and relating the unique point to a corresponding pulse height value, such pulse height value providing a value related to the degree of quench associated with the solution.

In a preferred embodiment disclosed herein, the light is in an ultraviolet wavelength range and the intensity of the light flashes is such that the pulse height spectrum produced in response to the light does not overlap a spectrum produced by the sample in the solution. Thus, sample activity and quench may be simultaneously determined.

DETAILED DESCRIPTION OF PREFERRED EMBODIMENT

Figure 1:
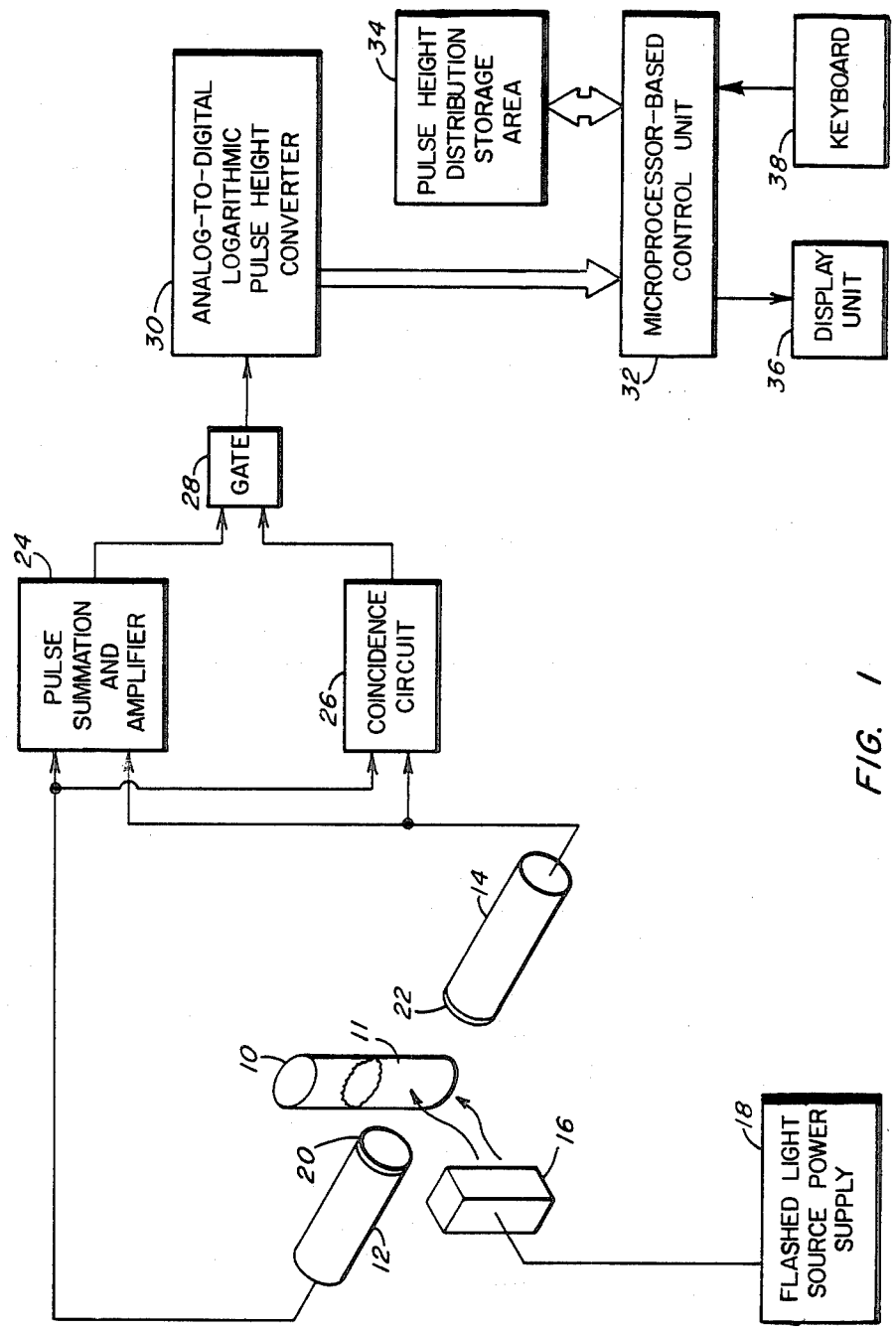
FIG. 1 is a block diagram of an apparatus in accordance with the present invention.

With reference to FIG. 1, an apparatus in accordance with the present invention is shown therein in functional block diagram form. The apparatus of FIG. 1 is adapted to receive a vial 10 within a shielded counting chamber. The vial 10 holds a liquid scintillation solution 11 comprising a radioactive sample and a conventional liquid scintillation medium. A pair of photomultiplier tubes (PMTs) 12 and 14 are arranged to detect and convert scintillations in the solution 11 into output voltage pulses, each such pulse having an amplitude proportional to the number of photons produced by the corresponding detected scintillation.

In accordance with the present invention, a flashed or pulsed light source 16 is disposed within the counting chamber. The source 16 is arranged such that light flashes emitted therefrom are directed to and fall upon the solution 11. In the embodiment disclosed herein, the flashed light source emits light in the ultraviolet wavelength range including, for example, at 260 nm. The wavelength of the light is selected to include 260 nm because the solvents in most liquid scintillation mediums absorb light at 260 nm. Thus, the light absorbed by the solvent simulates the start of the same energy transfer mechanism as stimulated by nuclear disintegrations within the sample. Briefly, such mechanism begins either by a beta particle or photons of light in the flash of light stimulating atoms of the solvent into an excited state. The excited solvent molecules in turn excite the molecules of the solute within the medium and as such solute molecules decay, emit photons. As will be appreciated, the wavelength of the light may be varied according to the absorption characteristics of the solvent.

As noted, most solvents absorb light at 260 nm. The solute within the medium, however, must not absorb light at the same wavelength as the solvent or absorb light at other wavelengths that may be emitted by the source 16. Thus, both the light wavelength or range of wavelengths and the medium itself are selected such that essentially only the solvent within the medium, and not the solute, is excited. The light wavelength may be controlled by selecting a suitable source having an emission spectrum that excludes wavelengths that would excite the solute or the source 16 may be filtered to obtain the same result. By way of nonlimiting example only, a medium having a solvent that absorbs light at a wavelength of 260 nm and a solute that does not absorb light of such wavelength may be the solvent 1,2,4-trimethyl benzene and the solutes PPO and M$_2$-POPOP.

A flashed light source power supply 18 powers the source 16 and, by adjusting the supply 18, adjusts the duration, intensity and repetition rate of the flashes from the source 16. The duration is limited in minimum length or on time by the intensity of the source 16 and the number of photons emitted by the source 16 per unit time. As will be described further hereinbelow, the minimum duration and intensity are selected such that a pulse height spectrum developed in response to the flashes of light from the source 16 does not overlap a pulse height spectrum developed for a sample suspended in the medium. The maximum flash duration is limited such that the intensity of a scintillation produced in the medium in response to a flash does not exceed the detection capabilities of the liquid scintillation counting apparatus.

Lastly, the repetition rate of the light flashes is determined by the number of counts required to adequately define a pulse height spectrum developed in response to the light flashes and may depend on such factors as the length of time during which counting takes place and the detected count rate of the radionuclide in the sample.

In the embodiment disclosed herein and by way of nonlimiting example only, the light flash duration may be in a range of about one to ten nanoseconds at a repetition rate of about 1000 flashes per minute. The flashed light source 16 and the flashed light source power supply 18 may be, for example, a Model 510C nanosecond excitation lamp, available from Photochemical Research Associates, Inc., of London, Ontario, Canada, and as described in a publication entitled "Fluorescence Lifetime Instrumentation" and appearing in a Photochemical Research Associates, Inc. price list dated Jan. 1, 1981.

It will be recognized that other suitable flashed light sources may be adapted for use with the present invention. For example, a continuous ultraviolet source may be used with a shutter to provide the required flash duration and repetition rate. Those skilled in the art will readily recognize other forms of flashed light sources which may be adapted for use with the apparatus of FIG. 1.

In the embodiment disclosed herein, the vial 10 is of quartz glass so as to not absorb the ultraviolet light emitted by the source 16. To shield the PMTs 12 and 14 from such ultraviolet light, the PMTs 12 and 14 are each fitted with a suitable ultraviolet absorbing lens 20 and 22, such as, Pyrex brand glass.

The output of each PMT 12 and 14 is applied to a pulse summation and amplifier 24. The pulse summation and amplifier 24 sums the pulses from the PMTs 12 and 14 and amplifies the summed result producing an analog pulse output.

The output of each PMT 12 and 14 is also coupled as an input to a coincidence circuit 26 which produces an output pulse upon receipt of essentially coincident input pulses. The outputs from the pulse summation and amplifier 16 and the coincidence circuit 18 are both applied to an analog gate 28 which passes the analog output from the pulse summation and amplifier 24 when the output pulse from the coincidence circuit 26 is also received by the gate 28. Thus, when a scintillation event within the solution 11 is detected by the PMTs 12 and 14, the coincident pulses from such PMTs 12 and 14 are summed by the pulse summation and amplifier 24 and are applied to the gate 28. The coincident pulses from the PMTs 12 and 14 are also detected by the coincidence circuit 26 which applies a pulse to the gate 28. In the presence of the output pulse from the coincidence cirtuit 26, the analog output pulse from the pulse summation and amplifier 24 is passed by the gate 28.

The output of the gate 28 is applied to an analog-to-digital (ADC) logarithmic pulse height converter 30 which provides a digital output logarithmically proportional to the height of the analog pulse applied thereto. The digital output of the ADC pulse height converter 30 is applied to a microprocessor-based control unit 32. The control unit 32 is of conventional design and includes a microprocessor and related memory and input-output interface units, all well known in the art. The control unit 32 compares the value of the digital output from the ADC pulse height converter 30 to a plurality of predetermined values which define a plurality of energy ranges or windows together spanning a predetermined energy or pulse height range. According to the value represented by the digital output from the ADC pulse height converter 30, the control unit 32 determines which window the digital value falls within and accordingly increments one storage location within a pulse height distribution storage area 34. The pulse height distributin storage area 34 includes a plurality of storage locations corresponding to the windows established by the control unit 32. As the liquid scintillation counting process is performed, the values stored in the various storage locations within the storage area 34 together represent a pulse height distribution curve. The storage area 34 may comprise, for example, a portion of the memory accessible to and controlled by the microprocessor within the control unit 32, each storage location within such storage area 34 being cleared or reset prior to the start of a liquid scintillation counting procedures.

The liquid scintillation counting system of FIG. 1 further includes a conventional display unit 36 such as a cathode ray tube (CRT) and a suitable input device such as a keyboard 38. The display unit 36 can display the count rate derived in a particular window or may display a curve graphically showing the pulse height distribution spectrum.

It will be recognized that the PMTs 12 and 14, pulse summation and amplifier 24, coincidence circuit 26, gate 28, ADC logarithmic pulse height converter 30, control unit 32, pulse height distribution storage area 34, display unit 36 and input device 38 are of conventional design and instruments employing such elements are well known in the liquid scintillation art. Such instruments include the Series 5800 and 9800 liquid scintillation counters available from Beckman Instruments, Inc., although those skilled in the art will recognize other suitable instruments which may be adapted in accordance with the inventive concepts taught herein.

Turning now to a description of the operation of the apparatus of FIG. 1 and a preferred embodiment of the method of the present invention, the vial 10 is placed into the counting chamber of the apparatus. The flashed light source power supply 18 is activated so as to cause the light source 16 to emit ultraviolet light flashes as described above. The intensity of such light flashes, also controlled by the flashed light power supply 18, is adjusted as described hereinbelow.

With the flashed light source 16 applying light flashes to the solution 11, the apparatus of FIG. 1 begins counting so as to determine pulse height spectra for the solution 11. Each scintillation occurring within the solution 11 is detected by the PMTs 12 and 14 which provide coincident pulses to the pulse summation and amplifier 24 and the coincidence circuit 26. The pulses are summed and amplified and are applied to the gate 28. Because the pulses from the PMTs 12 and 14 are coincident, the gate 28 passes the analog pulse output of the pulse summation and amplifier 24 to the ADC logarithmic pulse height converter 30. The converter 30 converts the analog pulse to a digital representation logarithmically proportional to the analog pulse. The digital representation is applied to the control unit 32 which compares the digital representation to the pulse height windows. A storage location in the storage area 34 corresponding to the window within which the digital representation falls is then incremented by the control unit 32.

At the end of some predetermined counting period, the collected counts in the storage locations may be read by the control unit 32 and displayed as a pulse height spectrum on the display unit 36.

Figure 2:
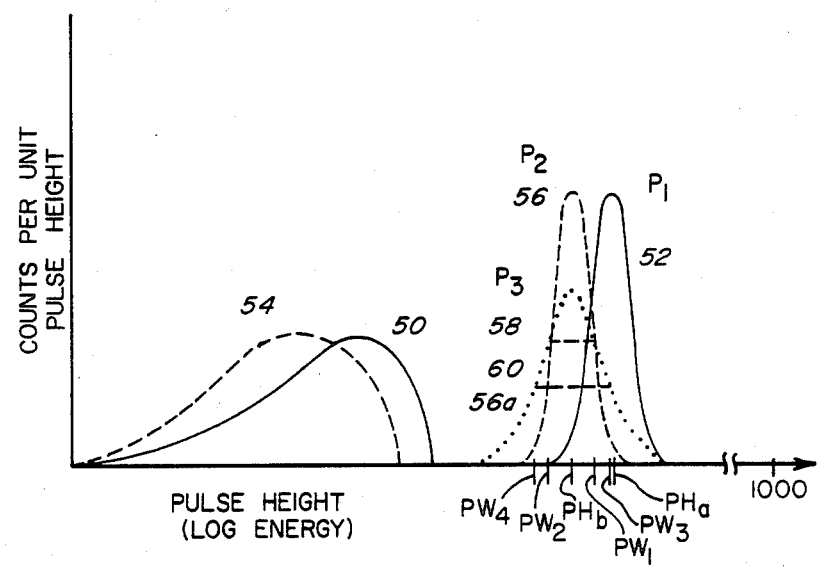
FIG. 2 depicts pulse height spectra obtained with the apparatus of FIG. 1 for varying degrees and types of quench.

Pulse height spectra for a typical solution 11 are shown in FIG. 2. A first spectrum 50 illustrates a pulse height spectrum for, for example, a carbon 14 sample in the solution 11. In accordance with the present invention, a second spectrum 52 represents the pulse height spectrum for scintillations occurring in the solution 11 in response to the flashed light source 16. The number of photons generated by the source 16 during each flash is adjusted by adjusting the supply 18 such that the spectrum 52 does not overlap the spectrum 50. In particular, the electrical energy delivered by the power supply 18 during each flash is controlled by means of suitable controls on the power supply 18, all in a conventional fashion, thereby controlling the intensity of the flash and thus the number of photons delivered to the solution 11 with each flash. The position of the spectrum 52 along the pulse height axis depends upon the number of photons delivered to the solution 11 with each flash. Thus, by selecting an appropriate flash intensity and duration, the spectrum 52 is placed on a portion of the pulse height axis such that the spectrum 52 does not overlap the spectrum 50. Because the spectra 50 and 52 do not overlap, both spectra may be simultaneously determined, and, as described more fully below, both sample activity and quench may be measured simultaneously.

With continued reference to FIG. 2, dashed spectra 54 and 56 represent pulse height shift which occurs in the solution 11 when the solution 11 is quenched. Although the radioactivity of the sample remains the same and the source 16 continues to generate light flashes as described above, quench in the solution 11 effectively shifts the spectra 50 and 52 to the left, that is, to lower pulse height values as seen by spectra 54 and 56, respectively.

In accordance with the present invention, quench in the solution 11 is advantageously and uniquely indicated by the shift of the pulse height spectrum generated in response to the light flashes from the source 16. By detecting a unique point on such spectrum and determining a corresponding pulse height value for such point, a value related to the degree of quench in the solution 11 is obtained and such value may be used to provide an indication of the degree of quench. In the embodiment disclosed herein, the unique point on the light pulse height spectrum is the peak thereof, although other unique points, such as inflection points on the leading or trailing edge of such spectrum, could also be used.

Such inventive concepts are illustrated with reference to FIG. 2. With the solution 11 at a first level or degree of quench, the spectra 50 and 52 are developed. A peak point $P_1$ of the spectrum 52 corresponds to a pulse height value $PH_a$ on the pulse height (log energy) axis. It will be recognized by those skilled in the art that the system of FIG. 1 may automatically select the peak point $P_1$ and the corresponding pulse height value $PH_a$ using, for example, the microprocessor within the control unit 32, using programming techniques and algorithms that are well known in computer art.

With the degree of quench in the solution 11 increased, the pulse height spectra shift as indicated by spectra 54 and 56. Accordingly, a peak point $P_2$ on the spectrum 56 corresponds to a second pulse height value $PH_b$ on the pulse height axis. Both of the pulse height values $PH_a$ and $PH_b$ provide values that are related to the degree of quench present in the solution 11. Moreover, the difference between the pulse height values $PH_a$ and $PH_b$ provides a quench number which indicates the degree of quench present in the solution 11 when the spectra 54 and 56 were developed with respect to the degree of quench present in the solution when the spectra 50 and 52 were developed. Such a quench number may be obtained automatically using, for example, the microprocessor within the control unit 32 and programming techniques well known in the art.

Such a quench number may be used to determine the degree of quench in various solutions with respect to a standard or calibration solution by comparing the pulse height values for the various solutions to a pulse height value obtained for the standard solution. For example, such a standard solution may be essentially unquenched to thus provide quench numbers which relate degrees of quench in solutions to the essentially unquenched standard solution. Such a quench number may further be used to implement automatic quench compensation in the liquid scintillation counting system using methods known in the art, such as that disclosed in U.S. Pat. No. 4,029,401.

In accordance with a further aspect of the present invention, an attribute of the shape of the pulse height spectrum generated in response to the flashed light source 16 further provides an indication of the nature of quench occuring in the solution 11. With continued reference to FIG. 2, the spectrum 56 represents a particular resolution defined as the result obtained by dividing a first value equal to the width of the spectrum 56 expressed in pulse height units by a second value equal to the pulse height value at the maximum point or peak height of the spectrum 56, the width being taken at some predetermined height along the spectrum 56 with respect to the maximum peak height. For example, the resolution of the spectrum 56 at one-half peak height is the width of the spectrum 56 expressed in pulse height units at one-half of its height, divided by the pulse height value corresponding to the maximum point of the spectrum 56. With reference to FIG. 2, the resolution of spectrum 56 may be determined at its one-half height where the width is shown by a dashed line segment 58. Such width, projected down to the pulse height axis, represents a width of $PW_1-PW_2$ pulse height units. To find resolution, the difference $PW_1-PW_2$ is divided by the pulse height value at the maximum point of the spectrum 56, or $PH_b$.

By comparing the resolution of various spectra, a qualitative determination of the nature of quench within the solution may be obtained. More particularly, a third spectra 56a shown by a dotted line in FIG. 2, may be obtained having the same maximum peak value $PH_b$ as spectrum 56. The half height resolution of the spectrum 56a is obtained by dividing the width of the peak 56a at its half height, shown by a dashed line segment 60 having a value of $PW_3-PW_4$ pulse height units, by $PH_b$, the pulse height value corresponding to a peak $P_3$ on the spectrum 56a. By inspection, it is apparent that the resolution value of the spectrum 56 is smaller than the resolution value of the spectrum 56a.

The resolution of a spectrum is affected by the nature of the quench occurring within the solution 11. More particularly, the resolution represented by the spectrum 56 represents predominantly homogeneous chemical quench in the solution 11. As is well known by those skilled in the art, chemical quench involves the reduction of the number of photons emitted by the solute within the liquid scintillation medium.

However, color quench may also be present in the solution 11 to varying degrees. Color quench may be described as the absorption of photons emitted by the solute. The presence of color quench results in the change in resoltion of the spectrum 56 to the resolution illustated by the spectrum 56a. The resolution of spectrum 56 represents predominantly homogeneous quench produced by chemical quench, while the resolution of the spectrum 56a represents a non-homogeneous quench provided both by chemical and color quench. It should be noted that although the resolution of the spectra 56 and 56a differ, the peak $P_3$ on the spectrum 56 corresponds to the same pulse height value as the peak $P_2$, namely, $PH_b$. Thus, the spectra 56 and 56a continue to represent the same degree of quench present in the solution 11 as well as indicating the type of quench occurring therein.

In an automatic system, the resolutions of the spectra 56 and 56a may be automatically calculated by the microprocessor within the control unit 32 using conventional programming techniques. For example, for the spectrum 56, the microprocessor detects the peak $P_2$, determines the height of such peak, divides the height by two, determines the width of the spectrum 56 at such half height in pulse height units, and divides such width by the pulse height value at $PH_b$. All such steps involve conventional programming techniques known in the computer and/or liquid scintillation art. Furthermore, the microprocessor may compare the resolution so obtained to a resolution obtained in a similar manner for a standard solution or for the solution which yielded the spectrum 56a. The result which may be displayed on the display unit 36 provides an indication of the homogeneous or non-homogeneous nature of the solution.

Those skilled in the art will appreciate that various modifications may be made in the apparatus and method of the present invention without departing from the scope of the appended claims. For example, although the above description has been set forth with respect to log energy along the pulse height axis, a pulse height axis linearly related to energy may also be used.

Moreover, the apparatus and method of the present invention may be adapted for use with a flow liquid scintillation system. In such a system, the flow cell is constructed of quartz as is the vial 10 as described above. As a particular advantage in a flow system, the present invention enables simultaneous determination of sample activity and quench.

What is claimed is:

1. A method for measuring a value related to quench associated with a liquid scintillation solution wherein the solution includes a sample, a solvent and a solute, the method including the steps of:

generating light flashes wherein the light includes a predetermined wavelength for exciting essentially only the solvent;

exposing the solution to the light flashes;

detecting a pulse height spectrum for scintillations produced in the solution in response to the light flashes;

determining a unique point on the pulse height spectrum; and relating the unique point to a corresponding pulse height value, such pulse height value providing a value related to quench associated with the solution.

2. A method as in claim 1, wherein the method further includes detecting a pulse height spectrum for the sample and the exposing step includes exposing the solution to the light flashes wherein the light flashes have an intensity and duration such that the pulse height spectrum produced in response to the light flashes does not overlap the sample pulse height spectrum.

3. A method as in claim 1, wherein the method further includes detecting an attribute related to the shape of the pulse height spectrum representing solution response to the light flashes to thereby provide a value related to the homogeneous or non-homogeneous nature of the quench present in the solution.

4. A method as in claim 1, wherein the method further includes comparing the pulse height value corresponding to the unique point to a pulse height value determined in a similar manner for a standard solution to provide an indication of the degree of quench present in the liquid scintillation solution with respect to the standard solution.

5. A method for indicating quench associated with a liquid scintillation solution wherein the solution includes a sample, a solvent and a solute, the method including the steps of:

generating light flashes wherein the light has a predetermined wavelength for exciting essentially only the solvent;

exposing the solution to the light flashes;

detecting pulse height spectra for scintillations produced in the solution in response to the light flashes and in response to the sample, the light flashes having an intensity and duration such that the pulse height spectrum produced in response to the light flashes does not overlap the sample pulse height spectrum;

detecting a unique point on the pulse height spectrum detected in response to the light flashes;

relating the unique point to a corresponding pulse height value; and comparing the pulse height value corresponding to the unique point to a pulse height value determined in a similar manner for a standard solution to provide an indication of the degree of quench present in the solution with respect to the standard solution.

6. A method as in claim 5, wherein the method further includes comparing an attribute related to the shape of the pulse height spectrum developed in response to the light flashes to an attribute related to the shape of a pulse height spectrum obtained in a similar manner for another sample to provide an indication of the homogeneous or non-homogeneous nature of the quench present in the solution.

7. An apparatus for indicating quench associated with a liquid scintillation solution wherein the solution includes a sample, a solvent and a solute, the apparatus including:

means for generating light flashes wherein the light has a predetermined wavelength for exciting essentially only the solvent;

means for exposing the solution to the light flashes;

means for detecting a pulse height spectrum for scintillations produced in the solution in response to the light flashes;

means for determining a unique point on the pulse height spectrum; and means for relating the unique point to a corresponding pulse height, such pulse height providing a value related to quench associated with the solution.

8. An apparatus as in claim 7, wherein the apparatus further includes means for detecting a pulse height spectrum for the sample and the means for exposing further includes means for exposing the solution to the light flashes wherein the light flashes have an intensity and duration such that the pulse height spectrum produced in response to the light flashes does not overlap the sample pulse height spectrum.

9. An apparatus as in claim 7, wherein the apparatus further includes means for detecting an attribute related to the shape of the pulse height spectrum representing solution response to the light flashes to thereby provide a value related to the homogeneous or non-homogeneous nature of the quench present in the solution.

10. An apparatus as in claim 7, wherein the apparatus further includes means for comparing the pulse height corresponding to the unique point to a pulse height determined in a similar manner for a standard solution to provide an indication of the degree of quench present in the liquid scintillation solution with respect to the standard solution.

11. An apparatus for indicating quench associated with a liquid scintillation solution wherein the solution includes a sample, a solvent and a solute, the apparatus including:

means for generating light flashes wherein the light has a predetermined wavelength for exciting essentially only the solvent;

means for exposing the solution to the light flashes;

means for detecting pulse height spectra for scintillations produced in the solution in response to the light flashes and in response to the sample, the light flashes having an intensity and duration such that the pulse height spectrum produced in response to the light flashes does not overlap the sample pulse height spectrum;

means for detecting a unique point on the pulse height spectrum detected in response to the light flashes; and means for relating the unique point to a corresponding pulse height value, such pulse height value providing a value related to quench associated with the solution.

12. An apparatus as in claim 11, wherein the apparatus further includes means for comparing the pulse height corresponding to the unique point to a pulse height determined in a similar manner for a standard solution to provide an indication of the degree of quench present in the solution with respect to the standard solution.

13. An apparatus as in claim 12, wherein the apparatus further includes means for comparing an attribute related to the shape of the pulse height spectrum developed in response to the light flashes to an attribute related to the shape of a pulse height spectrum obtained in a similar manner for another sample to provide an indication of the homogeneous or non-homogeneous nature of the quench present in the solution.

* * * * *